Figure 1:
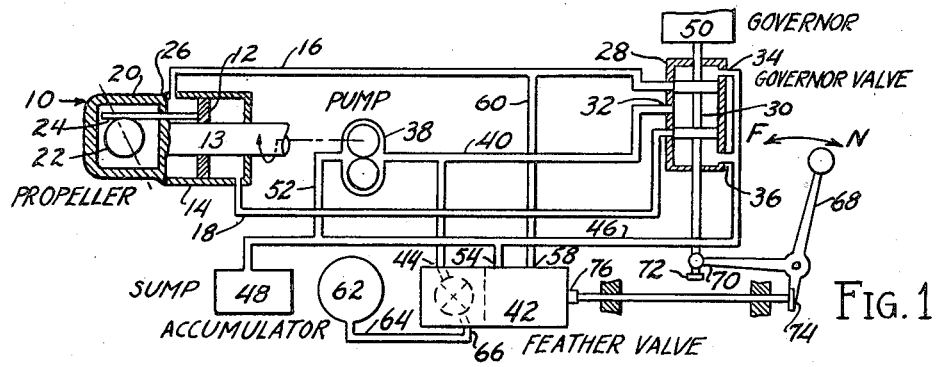

June 12, 1951  M. E. CUSHMAN  2,556,719
HYDRAULIC CONTROL VALVE
Filed April 25, 1947

INVENTOR.
MAURICE E. CUSHMAN
BY Godfrey O. Speir
ATTORNEY

Patented June 12, 1951

2,556,719

UNITED STATES PATENT OFFICE 2,556,719

HYDRAULIC CONTROL VALVE

Maurice E. Cushman, Verona, N. J., assignor to Curtiss-Wright Corporation, a corporation of Delaware Application April 25, 1947, Serial No. 743,748

10 Claims. (Cl. 60—51)

1

This invention relates to hydraulic control systems and to valves therefor and is concerned particularly with a hydraulic control valve operable to connect and disconnect a pressure source relative to a hydraulic circuit.

Certain hydraulic systems include a normal pressure source which may at times provide insufficient pressure for system operation, and an auxiliary pressure source, such as an accumulator, which can be connected into the system when the normal pressure source is inadequate. It is an object of this invention to provide a valve for connecting and disconnecting an auxiliary pressure source relative to a hydraulic system, an additional object being to provide such a valve which will operate in response to preselection of valve position and in response to pressure conditions in the hydraulic system. A further object of the invention is to provide a delayed action hydraulic valve, the delay depending on pressure conditions in the hydraulic system. A further object is to provide a hydraulic system and a valve therefor applicable to hydraulically controlled and operated aircraft propellers and other aircraft instrumentalities, wherein operating pressure shutoff may be desired in a hydraulic system at times when certain positional relationships of the system components exist, such relationships at times following a change in the position of the components relative to one another.

This application comprises improvements, in part, in the hydraulically controllable pitch propeller system disclosed in my copending patent application Serial No. 651,264 filed March 1, 1946, and entitled "Hydraulic Pitch Changing System." The present invention, however, may be applied not only to the propeller pitch changing system of said application but to other forms of hydraulic systems and its use is not limited to any particular system. While the system and valve of the invention are designated as hydraulic in character, they may be adapted for pneumatic operation and where the term hydraulic is used it is to be read as including "pneumatic."

The objects of the invention above outlined, and others which will become apparent as the description proceeds, are achieved by the structure and arrangements set forth in the following detailed description when read with the accompanying drawing. It is to be expressly understood that the drawing is employed for illustration of only a single possible embodiment and is not to be construed as limiting the scope of the invention, reference being had to the appended claims for this purpose.

2

Figure 2:
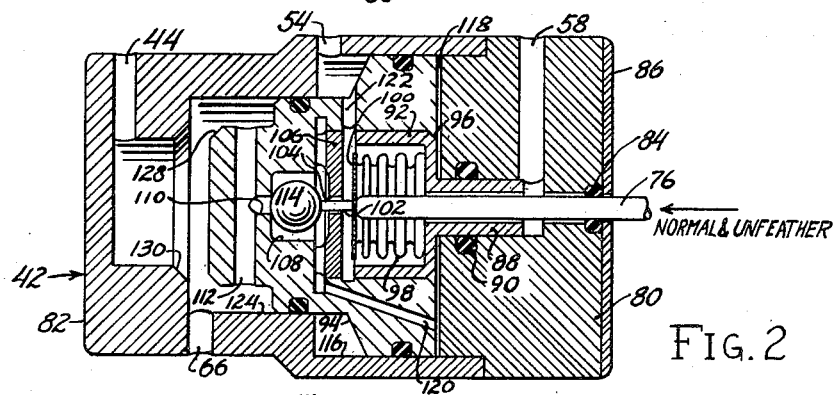
Figure 3:
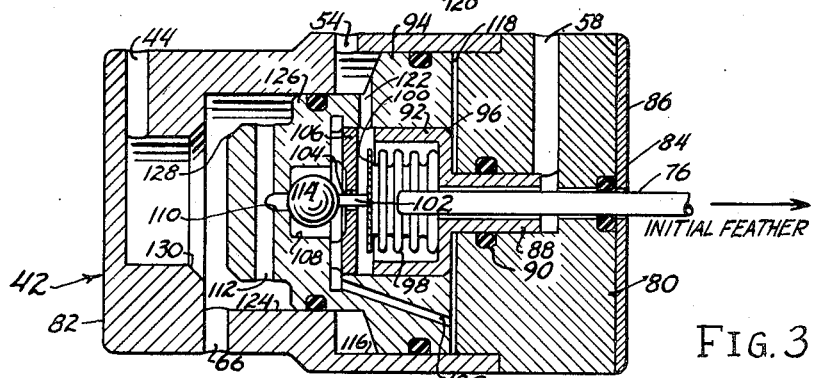
Figure 4:
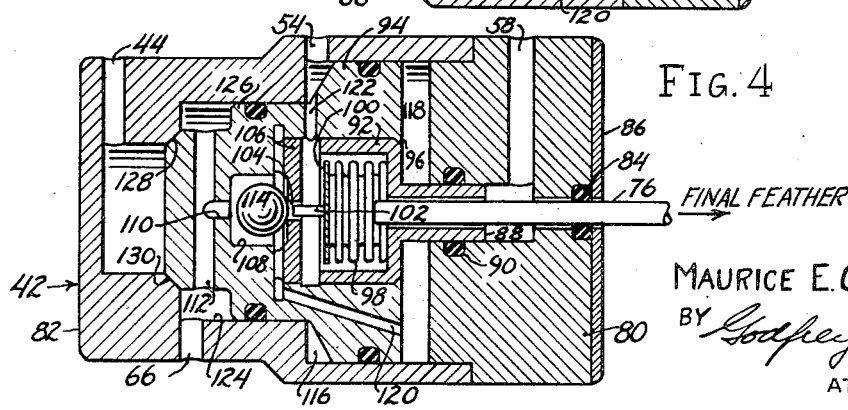

In the drawing, in which similar reference characters designate similar parts, Fig. 1 is a schematic diagram of a hydraulic system incorporating the features of the invention, and Figs. 2, 3 and 4 are enlarged longitudinal sections of a control valve as incorporated in Fig. 1, showing the valve components in different positions of adjustment.

Referring first to Fig. 1, 10 represents a piston type hydraulic motor which as shown is incorporated in a controllable pitch propeller. A piston 12, of annular form, embraces, rotates with, and is axially movable along a propeller shaft 13, the piston being movable in a stationary cylinder 14 having conduits 16 and 18 communicating with opposite ends thereof. The shaft 13 carries a propeller hub 20 within which are journalled one or more propeller blades 22 the latter being alterable in pitch during propeller operation by means of racks 24, engaging gear teeth on the propeller blades, the racks being directly connected to the piston 12 and passing through the rear wall of the hub 20. The hub is rotatable, and is sealed with respect to the cylinder 14 through sealing means 26.

The conduits 16 and 18 lead to ports in a housing 28 said housing containing a valve 30. The housing 28 likewise has a pressure fluid supply port 32 connected to the output of a pump 38 through a pipe 40, this pipe also having a branch leading to a port 44 in a control valve 42. Ports 34 and 36 at the ends of the housing 28 are connected with a conduit 46 leading to a sump or reservoir 48.

During normal operation of the system as thus far described, the valve 30 is controlled by a governing device such as 50, and may move upwardly or downwardly to admit pressure fluid from the port 32 to the conduits 16 or 18, respectively to decrease or increase the pitch of the propeller blade 22. While pressure fluid is admitted to either end of the cylinder 14, the opposite end of the cylinder is opened to the sump ports 34 or 36 by the valve 30. Normal operation of the valve 30 by the governor 50 causes blade pitch change to maintain the propeller at constant rotational speed. Forced movement of the valve 30 may be imposed, as will be described, to cause blade pitch changes beyond the control of the governor.

The intake of the pump 38 is connected to the sump conduit 46 by a conduit 52. A port 54 on the control valve 42 is likewise connected to the sump conduit 46. The conduit 16 leading to the front or decrease pitch end of the cylinder 14 is connected to a port 58 on the control valve 42 by a conduit 60. A pressure fluid accumulator 62 is connected through a conduit 64 to a port 66 on the control valve 42.

The control valve 42 as will be described in detail later serves at times to connect the accumulator 62 with the pump output line 40.

The propeller 10 of Fig. 1 is capable of being feathered in operation, such feathering being desirable to reduce the drag of a propeller when it is not operating or being driven by a power plant. The need for propeller feathering mechanism is well known in the art. A control is provided to feather the propeller, in the form of a manually operable lever 68 which carries a projection 70 which, when the lever 68 is moved to the left, to the feather position, engages an abutment 72 on the stem of the valve 30, forcing downward movement of the valve regardless of signals imparted to the valve by the governor 50, the valve thereby opening the pressure line 40 to the rear or pitch increasing end of the cylinder 14. Pressure provided by the pump 38 will thereby increase propeller pitch toward a feathering position. However, since the fluid pump 38 is normally driven by the propeller or by the shaft 13, pump fluid delivery varies with propeller rotational speed. If the propeller is windmilling, its speed is controlled by air speed and blade pitch, and as a high pitch position is reached, short of the feathering position, where the shaft 13 is turning slowly, the pump 38 will generate insufficient pressure to accomplish final propeller feathering. To provide the high pressure necessary to accomplish propeller final feathering in a short time interval, the accumulator 62 is connected to the system pressure line 40 through the normally open valve 42 and the conduit 44. The accumulator, comprising a reservoir of pressurized fluid, will provide sufficient additional fluid in addition to that furnished by the pump 38, to place the propeller in full feathered position.

When the lever 68 is moved leftwardly to feather the propeller, a projection 74 on the lever relaxes pressure on a valve stem 76 of the valve 42 for a purpose which will become clear as the specification proceeds. This relaxation of pressure on the valve stem 76 serves ultimately to allow shutoff of the accumulator from the line 44 by closing of the valve 42 when feathering is finally accomplished.

When it is desired to unfeather the propeller, the lever 68 is moved rightwardly to the normal position, relaxing pressure on the valve stem 72 and restoring the valve 30 to control by the governor 50. Concurrently, pressure is imposed on the valve stem 76 serving to open the valve 42 to allow accumulator fluid to pass to the system pressure line 40 and thence to the valve housing 28. The valve 30 in the latter, having been restored to governor control, will call for pitch reduction—that is, the pressure line 40 and its port 32 will be placed in communication with the decrease pitch pressure line 16, passing hydraulic fluid from the accumulator 62 to the front or decrease pitch end of the propeller cylinder 14 thereby enforcing pitch reduction. As pitch is reduced, the propeller will begin to windmill, picking up rotational speed whereby the pump 38 is driven and again delivers pressure fluid for governed propeller operation. As the fluid pressure from the pump 38 builds up, the accumulator 62 will be recharged through the open valve 42 so that the accumulator will be available for future feathering operations when needed.

The detailed operation of the control valve 42 will now be described along with the relationships of the pressures existing in the system, in the accumulator 62, and in the pressure line 40 and in the pitch decrease line 16, under the several operating conditions encountered during normal and unfeathering operation (Fig. 2), initial feathering operation (Fig. 3), and final feathering operation (Fig. 4).

The valve 42 in Figs. 2, 3 and 4 comprises a two-piece housing including a base element 80 and hollow element 82 fitted thereto. The element 80 contains an axial hole through which the valve stem 76 enters the valve assembly, the stem being sealed in the element 80 by an O ring 84 retained by a cover plate 86. An axial bore within the element 80 is slidably engaged by a sleeve 88 sealed relative to the element 80 by an O ring 90, said sleeve having a bore somewhat larger than the stem 76 through which said stem passes. The sleeve 88 is integral with a cup 92 press fitted in a bore in an axially movable valve member 94, the cup 92 being secured to the member 94 as by peening at the point 96. The cup 92 contains a flexible bellows 98 closed at its leftward end by a partition 100 and secured or sweated at its rightward end to the bottom of the cup 92. The interior of the bellows 98 communicates through the annular passage around the valve stem 76 with the port 58 formed in the element 80, this port as previously described, being connected to the front or leftward end of the cylinder 14 as shown in Fig. 1. When moved by the feather lever 68 (Fig. 1) the stem 76 either relaxes contact with the bellows closure 100, as shown in Figs. 3 and 4, or forces the bellows closure leftwardly as shown in Fig. 2. The bellows closure carries a pin 102 passing through an orifice 104 in a cover 106 within the member 94, said cover serving to close a ball valve chamber 108 formed within the member. An orifice 110, coaxial with the orifice 104, establishes communication between the chamber 108 and the outside of the member 94 near the left end thereof through a cross drilling 112. The chamber 108 contains a ball 114 which is movable to close off either the orifice 110 or the orifice 104 for a purpose to be described.

The member 94 is stepped in diameter, its rightward end having the largest diameter and having O ring sealed fitting engagement with the wall of a large bore. A chamber 116 is defined in the housing element 82 leftwardly of the large diameter part of the member 94, the chamber 116 registering with the sump port 54. The rightward end of the bore 116 is terminated by the leftward wall of the housing element 80 and forms with the rightward end of the member 94 a chamber 118 which communicates at all times with the chamber 108 through a drilling 120 in the member 94. The chamber 116 communicates at all times with the cavity in the member 94 in which the bellows 98 is disposed, through a drilling 122.

The housing element 82 is provided with an intermediate diameter bore defining a chamber 124 to which an intermediate diameter portion 126 of the member 94 is O ring sealed and fitted. The leftward end of the member 94, leftwardly of the drilling 112 and the orifice 110 is provided with a small diameter portion comprising a valve face 128 engageable with a valve seat 130 in the leftward end of the housing element 82. The left side of the valve seat 130 communicates with the port 44 leading to the pump outlet, while the right side of the seat 130, comprising the chamber 124, communicates at all times with the port 66 leading to the accumulator 62. Also, the drilling 112 and the orifice 110 are continuously in communication with the port 66.

Under normal operating conditions and for unfeathering, the valve elements occupy the positions shown in Fig. 2, wherein the valve stem 76, through the bellows pin 102, forces the ball valve 114 to close the orifice 110. This places the large diameter chamber 118 in communication with the sump port 54 through the passage 120, the chamber 108, the orifice 104 and the passage 122, so that there is no force, save that exerted by the fluid pressure in the port 58 acting on the interior of the bellows 98 and on the end of the sleeve 88 and that exerted by the stem 76, to cause leftward movement of the main valve member 94. Since accumulator pressure exists at the ports 65 and 44, this pressure is imposed on the entire leftward face of the valve member 94, over the area defined by the intermediate diameter bore of the chamber 124, thus forcing or holding the valve member 94 to the right with the valve face 128 off of the seat 130.

This communication of the ports 44 and 66 with one another continues throughout normal operation of the propeller or hydraulic system.

It should be noted here that such pressure as may exist in the pitch decreasing end of the propeller operating cylinder is freely communicated to the port 58 of the valve 42, this pressure acting within the bellows 98 to enforce movement of the pin 102 leftwardly to hold the ball 114 in a closing position against the orifice 110. Since the bellows diameter is substantially less than the diameter of various portions of the member 94 subject to other pressures, the pressure within the bellows, by itself, will have no effect in causing movement of the member 94.

Now referring to Fig. 3, the position of the valve elements is shown when propeller feathering is initiated by relaxing pressure on the valve stem 76, due to movement of the feather handle 68 to the feather position. In this phase of operation, the only change in the position of the valve elements is the relaxation of pressure on the stem 76. Otherwise, the valve member 94 remains in the same position as in Fig. 2, retaining communication between the valve ports 44 and 66. At this time, propeller pitch change will be urged in a pitch increasing direction, beyond the control of the governor 59, and moderate pressure will remain in the forward end of the propeller cylinder 14 which is communicated through the conduits 16 and 60 to the port 58 and to the interior of the bellows 98. Expansion of the bellows from this internal pressure holds the ball valve 114 against the orifice 110. This pressure at the port 58 is sufficient to hold the ball valve against the orifice 110 despite the higher pressure existing in the chamber 124.

As propeller pitch approaches a feathering angle, propeller rotational speed will decrease and concurrently, output from the pump 38 will decrease. However, pressure fluid from the accumulator 62 will continue to enforce blade pitch change until the final position of feathering of the propeller is reached. This final position of feathering is limited by leftward movement of the propeller piston 12 in its cylinder 14. When the piston 12 reaches its limit of movement, fluid pressure in the left end of the cylinder 14 and in the line 16 will decrease to sump pressure. Since the leftward end of the cylinder 14 is in continual communication with the interior of the bellows 98, when the pressure falls off, the bellows 98 will retract as shown in Fig. 4 due to its own spring force, moving the pin 102 out of contact with the ball 114 and allowing the ball to move from the orifice 110 to close the orifice 104.

Opening of the orifice 110 transmits accumulator fluid pressure from the port 66 through the chamber 108, the passage 120 and into the large diameter chamber 118 at the rightward end of the member 94. While the unit pressure in the chamber 118 and in the chamber 124 is the same, the effective area of the chamber 118 is considerably greater than that of the chamber 124 and thus, the valve member 94 is forced to move leftwardly whereby the valve face 128 on the member 94 engages the valve seat 130 on the element 82. This closes the ports 44 and 66 from communication with one another and seals off the accumulator from the balance of the hydraulic system. After closure of the valve 128 against the seat 130, any leakage or pressure reduction in any part of the system communicating with the port 44 becomes immaterial since the system is out of operation, the propeller is stationary and in feathering pitch and no further need for pressure in the system currently exists.

By the above valve action sequence it will be clear that the stem 76 is utilized to preselect closure of the valve face 128 against the seat 130 to shut off accumulator pressure from the system; but such valve closure is not attained until final feathering position is reached and until pressure in that part of the circuit communicating with the port 58 has fallen to a negligible value. In effect, the valve has delay action, the delay, after pre-selection, hinging upon the completion of feathering or upon the completion of a complete stroke of the hydraulic motor.

Should re-starting of the engine and restoration of the propeller system to normal operating pitch be desired, the lever 68 is returned to the "normal" position which drives the valve stem 76 inwardly to enforce movement of the ball 114 to close the orifice 110. As previously described in connection with Fig. 1, the chamber 118 is thus bled to the sump and accumulator pressure acting in the chamber 124 on the annular area between the valve seat 130 and the intermediate bore enforces opening of the valve member 94, to establish communication between the ports 44 and 66.

From the foregoing detailed description it will be seen that the valve unit 42 is in effect a hydraulic servo mechanism operated by relatively large pressure which is valved to appropriate cavities within the main valve assembly by small operating forces. The details of valve construction are susceptable to numerous changes and modifications: for instance, the bellows unit 98 may be replaced by a piston unit utilizing springs for urging the ball valve operating pin 102 against the pressure existing in the port 58. Numerous mechanical modifications and rearrangements of the elements may be embodied in the valve without altering its essential mode of operation.

It is contemplated that a valve such as 42 might be utilized to good advantage for relieving operating pressure from a hydraulic system when a hydraulic motor such as the motor on the propeller in Fig. 1 has reached a terminal position. Hydraulic systems of the sort used in machine tools, in hydraulic remote control devices, in aircraft flap and landing gear operators and many others, are susceptible to the incorporation of the teachings of this invention.

Though but a single embodiment illustrating the invention has been illustrated and described, it is to be understood that the invention may be applied in various forms. Changes may be made in the arrangements shown without departing from the spirit or scope of the invention as will be apparent to those skilled in the art and reference should be made to the appended claims for a definition of the limits of the invention.

What is claimed is:

1. In a hydraulic servo shutoff valve between pressure lines having variable pressure phases, a housing having coaxial different diameter bores defining cavities and a coaxial valve seat of diameter smaller than said bores; a valve member slidable in said bores having a seat engaging portion, a smaller bore engaging portion and a larger bore engaging portion, said member having a chamber therein including valve seats and passages connecting said chamber with said cavities, a servo valve within said valve member movable to a first position against one of said seats to establish communication between said smaller bore cavity and said larger bore cavity and alternatively movable to a second position against another of said seats to establish communication between said larger bore cavity and a pressure relief connection, and means to move said servo valve to said first position.

2. A hydraulic system comprising a conduit at system pressure, a conduit from an accumulator, a shutoff valve between said system and accumulator conduits actuatable by accumulator and system pressure, a valve position selector movable to valve opening and closing positions, and a servo device in said valve responsive to pressure of an element of the system to apply system pressure on the valve to hold said valve open, said device becoming inoperative in response to substantial decrease of pressure in said element of the system subsequent to moving of said selector to a valve closing position and applying accumulator pressure upon said valve to close same.

3. A hydraulic system comprising a conduit at system pressure, a conduit from an accumulator, a valve to open and close said conduits to one another, a preselector for operating said valve, means actuated by said preselector to open said valve under the influence of system pressure, and means actuated by said preselector to close said valve under the influence of accumulator pressure.

4. A hydraulic system comprising a conduit at system pressure, a conduit from an accumulator, a valve to open and close said conduits to one another, a preselector for operating said valve, means actuated by said preselector to cause valve operation under the influence of pressure in said system conduit, an element of said system having a pressure different from that of the system proper and the accumulator and subject to independent change, and means responsive to substantial element pressure to inhibit valve closing upon preselector adjustment to a closing position.

5. A hydraulic system comprising a conduit at system pressure, a conduit from an accumulator, a valve to open and close said conduits to one another, a preselector for operating said valve, means actuated by said preselector to open said valve under the influence of system pressure, means actuated by said preselector to condition said valve for closing under the influence of accumulator pressure, an element of said system having a pressure different from that of the system proper and the accumulator and subject to independent change, and means responsive to substantial element pressure to inhibit closing of said valve when said preselector is adjusted for valve closing, and to allow such closing when element pressure diminishes.

6. In a hydraulic system having a conduit, a fluid pressure operated valve operable by pressure on opposite sides of the valve to open and close said conduit, an element of said system having a changeable hydraulic pressure substantially independent of the system proper but dependent as to its pressure on continued opening or closing of said valve, and means to direct the conduit fluid pressures for valve operation responsive to change in pressure in the system element.

7. In a hydraulic system having a conduit, a valve operable to open and close said conduit, a servo cell in said valve subject to conduit pressure and tending to open said valve, a second servo cell in said valve subject at times to conduit pressure to overcome the pressure in the first cell and to close said valve, and auxiliary valve means to open said second cell to conduit pressure, and to close said second cell from said conduit pressure and simultaneously to vent said second cell, said auxiliary valve means comprising a manually operable selector movable to a valve operating position to close off said second cell from conduit pressure and movable to an alternate position, and a fluid pressure responsive device cooperating with said selector and operable when said selector is in said alternate position to open said second cell to conduit pressure, said device being responsive in its operation to pressure unrelated to and independent of said conduit pressure and unrelated to manual operation of said selector.

8. In a hydraulic system having a conduit, a fluid pressure operated valve operable by conduit pressures on opposite sides of the valve to open and close said conduit, said hydraulic system having a changeable hydraulic pressure substantially independent of the conduit pressures but dependent upon operation of said system, and means to direct conduit fluid for valve operation in response to decrease in said independent changeable hydraulic pressure.

9. In a hydraulic system having a conduit, a fluid pressure operated valve operable by conduit pressure on opposite sides of the valve to open and close said conduit, said hydraulic system having a changeable hydraulic pressure substantially independent of the conduit pressures but dependent upon operation of said system, means to direct conduit fluid for valve operation in response to decrease in said independent changeable hydraulic pressure, and manually operable means independent of said changeable pressure to direct conduit fluid for valve operation upon failure or non-existence of said independent pressure.

10. In a hydraulic system having a conduit, a valve housing and a main valve therein, conduits connected to said housing and one face of said main valve being exposed to the fluid pressure from one of said conduits at all times, a cylinder forming part of said housing, a piston in said cylinder, rigid with said main valve, said cylinder at times being connectible to the other of said conduits and said piston being movable to close said valve unit when pressure from the other said conduit is admitted to said cylinder, a servo valve to open and close said cylinder to said other conduit, a variable fluid pressure system independent of pressures in said conduits and dependent on system operation, means to operate said servo valve in response to decrease in said independent fluid pressure to close said main valve, and means to operate said servo valve selectively and manually in the opposite direction to open said main valve.

MAURICE E. CUSHMAN.

REFERENCES CITED

The following references are of record in the file of this patent:

UNITED STATES PATENTS

| Number | Name | Date |
| --- | --- | --- |
| 256,702 | Johnson et al. | Apr. 18, 1882 |
| 288,331 | Haskell | Nov. 13, 1883 |
| 347,856 | Wiedling | Aug. 24, 1886 |
| 687,273 | Schoeffel | Nov. 26, 1901 |
| 780,614 | Nash | Jan. 24, 1905 |
| 931,228 | Schutte | Aug. 17, 1909 |
| 1,535,562 | Atkins | Apr. 28, 1925 |
| 1,834,922 | Abercrombie | Dec. 8, 1931 |
| 1,888,392 | Penick | Nov. 22, 1932 |
| 2,398,713 | Martin | Apr. 16, 1946 |